United States Patent [19]

Kamata et al.

[11] Patent Number: 5,321,238
[45] Date of Patent: Jun. 14, 1994

[54] BANKING APPARATUS FOR PROCESSING THE BILL AND THE CHECK

[75] Inventors: Hideo Kamata, Kawasaki; Masami Yasuda, Chofu; Satoshi Kataoka, Fuchu; Hideyuki Inaoka, Tama; Tomohiro Matsuhashi, Tachikawa; Eiichi Watanabe, Kawasaki, all of Japan

[73] Assignee: Fujitsu Limited, Kawasaki, Japan

[21] Appl. No.: 727,367

[22] Filed: Jul. 9, 1991

Related U.S. Application Data

[63] Continuation of Ser. No. 483,706, Feb. 23, 1990, abandoned.

[30] Foreign Application Priority Data

Mar. 10, 1989 [JP] Japan .................... 1-56263

[51] Int. Cl.⁵ .............................. G06F 15/30
[52] U.S. Cl. ...................... 235/379; 235/449; 364/408; 902/5; 902/40
[58] Field of Search .......................... 235/379

[56] References Cited

U.S. PATENT DOCUMENTS

| | | | |
|---|---|---|---|
| 3,988,571 | 10/1976 | Blair et al. | 235/379 |
| 4,027,142 | 5/1977 | Paup et al. | 235/379 |
| 4,082,945 | 4/1978 | van de Goor et al. | 235/379 |
| 4,205,780 | 6/1980 | Burns et al. | 235/449 |
| 4,358,671 | 11/1982 | Case | 235/379 |
| 4,404,649 | 9/1983 | Nunley et al. | 235/379 |
| 4,523,330 | 6/1985 | Cain | 235/379 |
| 4,843,219 | 6/1989 | Franchi | 235/379 |
| 4,984,281 | 1/1991 | Matsuhashi | 235/449 |

Primary Examiner—Eugene R. LaRoche
Assistant Examiner—Christopher Glembocki
Attorney, Agent, or Firm—Armstrong, Westerman, Hattori, McLeland & Naughton

[57] ABSTRACT

A terminal banking apparatus for processing bills and checks includes an input apparatus for inputting the number of each account and the amount of bills or checks at a front counter of a bank, a tentative paying file for storing the number of each account and the corresponding amount input from the input apparatus, a magnetic ink character reader for reading the number of the account described by magnetic ink characters on each of the bills or checks carried, and an amount reader for reading the amount described on the bills or checks stored in the tentative paying file depending on the number of the account read by the character reader. Also included is an amount encoder for describing the amount with magnetic ink characters on the bills or checks, a total amount checking apparatus for checking the total amount depending on the amount read out and a preset total amount, a lateral-line marking apparatus for marking lateral lines on bills or checks, an imaging apparatus for taking photographs of both the front and rear surfaces of bills or checks which have completed all processings, an image file for storing photographs and a transfer apparatus for transferring bills and checks.

3 Claims, 6 Drawing Sheets

BANKING APPARATUS FOR PROCESSING THE BILL AND THE CHECK

This application is a continuation division of application Ser. No. 483,706 filed Feb. 23, 1990 now abandoned.

BACKGROUND OF THE INVENTION

(1) Field of the Invention

The present invention relates to a banking terminal apparatus for processing bills and checks, and more specifically to an apparatus to be used for a series of processings executed for bills and checks at the front counter or back office.

(2) Description of the Related Art

The bills and checks carried to a bank have been processed by the procedures shown in FIG. 1. Namely, the number of an account and the amount of money are input at the front counter of a bank as a branch and these numbers of accounts and amounts of money, input from an input apparatus, are sent to the center connected to a plurality of branches. The data transmitted from respective branches are stored for management of transactions at the center. Moreover, a detailed estimate sheet describing a total input sheet of bills or checks and a total amount of money is also generated. A bank book temporarily entering the data is returned to a customer as a receipt (ST1) and bills, checks and detailed estimate sheet are transferred to a hopper in the back office (ST2) for processing.

In the back office, a total amount of money described in the detailed estimate sheet is first input to an amount checking apparatus for the processing in units of sheets. A teller reads the numerals (checkwriter characters) indicating the amount being impressed on the surface of bills or checks and inputs the amount of money to an amount encoder from the keyboard (ST3).

As a result of the input, the amount encoder enters the amount of money to the magnetic ink character input domain of the bill or check with the magnetic ink. The bills or checks which have been input are transferred to the stacker (ST4).

This processing is continued for all bills or checks placed in the hopper (ST5).

Lateral lines are impressed (ST6) on all bills or checks in the stacker, the amounts of bills and checks are summed (ST7) for obtaining a total amount and it is collated (ST8) with the total amount input to the amount checking apparatus. If these are matched, the front and rear surfaces of bills or checks are photographed (ST9) and are stored under the assumption that there has been no error in the input processing. If these are not matched, the input processing for all bills and checks is retried (ST10) under the assumption that there have been errors in the input processing. This check must be continued until such amounts are matched. Those to be transferred to the bill clearing house among the bills or checks having completed the processing mentioned above are gathered with attachment of a tag describing the total amount and a number of sheets of bills and checks.

Such a series of processing steps, is manually carried out taking a long period of time. Particularly, such processing requires double inputs of the amount of money of bills or checks, resulting in a problem in that an input error may often be generated. If an error is found in the characters described by the magnetic ink on the bills or checks due to input errors in the amount of money, such erroneous input is eliminated after making of a correcting mark and the connected input should be made manually (without using magnetic ink). When such correction is made, the automatic processing which is done by reading magnetic ink characters of bills or checks can no longer be carried out at the bill clearing house.

Moreover, if an input error in the amount of money is found, there will exist a problem in that the total amount becomes inaccurate and all bills or checks must be checked for obtaining an accurate total amount. Therefore, there is a need in the art to develop a processing method for bills or checks which can reduce generation of input errors.

Recently, a method of quick processing of bills or checks reducing manual operation steps has been disclosed in the Japanese Patent Laid-open No. 62-14262 (by M. Yoshikawa). However, the processing disclosed in this Japanese Patent is not based on the concept that the data input by the processing at the front counter in the bank is utilized also for the latter processing (in the back office) and therefore this processing does not provide the effect of reducing input processing errors for bills or checks.

SUMMARY OF THE INVENTION

It is an object of the present invention to reduce generation of errors during processing of bills and checks.

It is another object of the present invention to execute processing for bills or checks without manual operations.

These objects are achieved by utilizing a banking terminal apparatus for processing bills and checks, comprising:

an input apparatus for inputting the account number and amount of money of bills or checks at the counter in the bank;

a tentative paying file for storing the number of account and amount to be input;

a magnetic ink character reader for reading the number of an account written by magnetic characters on the bills or checks carried;

an amount reader for reading the amount impressed on bills or checks stored in the tentative paying file depending on the number of the account read out;

an amount encoder for describing the amount read out to the specified area of the bill or check with magnetic characters;

a total amount checking apparatus for checking the total amount by subtracting the readout amount from the total amount input previously;

a lateral-line marking apparatus for marking lateral lines on a bill or check describing an amount described by the amount encoder;

an imaging apparatus for photographing the front and rear surfaces of bills or checks which have completed the processing;

an image file for storing image data of the photographed bills or checks; and a transfer apparatus for transferring bills or checks among the magnetic ink character reader, amount encoder, lateral-line marking apparatus and imaging apparatus.

Namely, in the present invention, the number of the account and the amount described on the bills or checks are input to an input apparatus at the front counter and stored in the tentative paying file. The number of the account described by the magnetic ink on the bills or checks is read by the magnetic ink character reader. The amount reader reads the amount described by a bill or check from the tentative paying file based on the number of the account read out and the amount encoder describes such amount with the magnetic ink to the predetermined area of a bill or check. Moreover, the total amount checking apparatus checks a total amount from the amount read out and a preset total amount and the lateral-line marking apparatus impresses lateral lines to a bill or check on which the amount is described (i.e. written or imprinted) by the amount encoder. The imaging apparatus takes a picture of the front and rear surfaces of a bill or check having completed such processing and stores image data representing an image of the bill or check in the image file. A bill or check is sequentially transferred to the magnetic ink character reader, amount encoder, lateral-line marking apparatus and imaging apparatus by the transferring apparatus. As explained above, since the number of the account and amount are input once to the input apparatus at the front counter in the bank, generation of input errors may be reduced. In addition, the processing steps for processing a bill or check in the back office are carried out automatically by utilizing the data input at the front counter and moreover without manual operation.

DESCRIPTION OF THE PREFERRED EMBODIMENT

Figure 1:
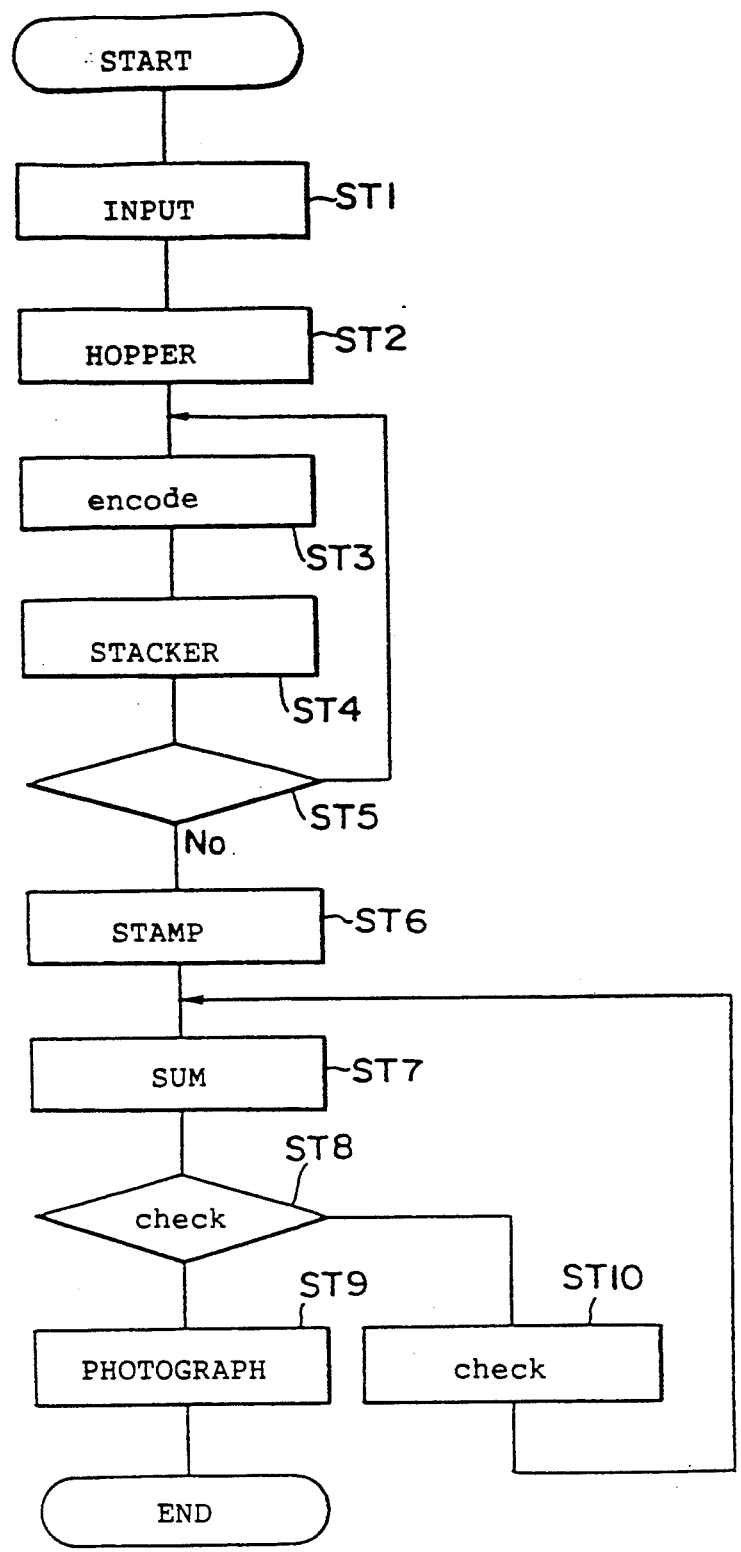
FIG. 1 is a flowchart indicating the conventional processing procedures for a bill or check.

An embodiment of the present invention will be explained hereunder with reference to FIG. 2 to FIG. 5. Like elements are designated by like reference numerals throughout the drawings.

FIG. 2 to FIG. 5 indicate an embodiment of a banking terminal apparatus for processing bills and checks according to the present invention.

Figure 2:
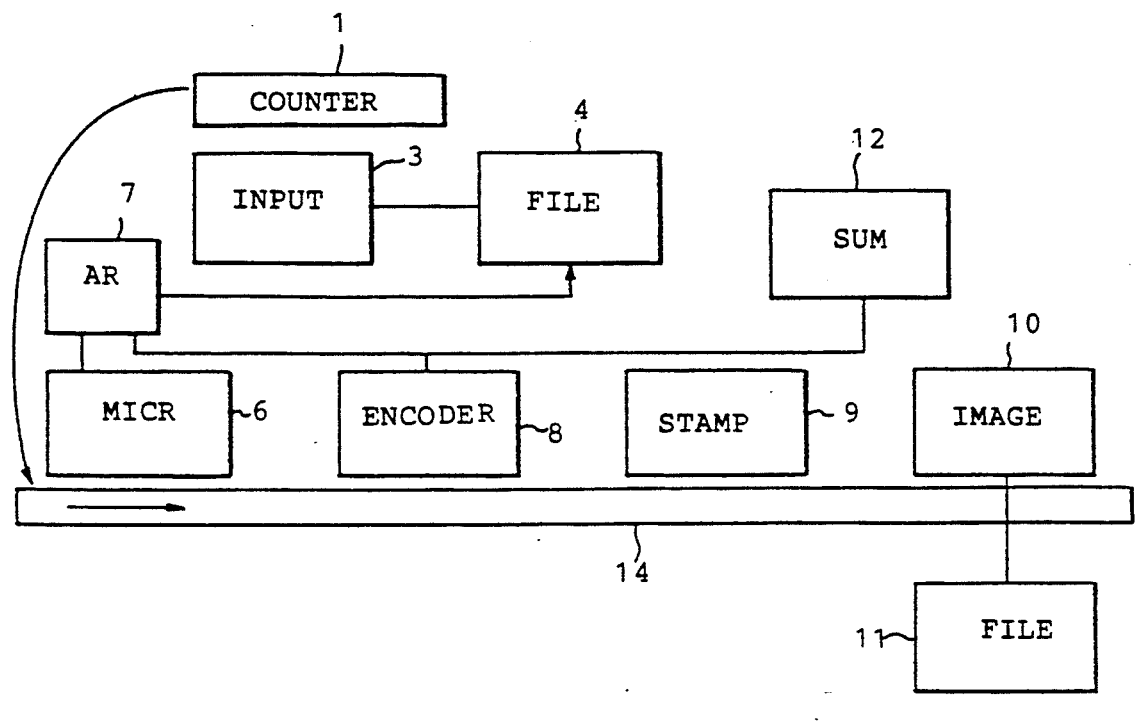
FIG. 2 is a block diagram for explaining an outline of a banking terminal apparatus for processing bills and checks of the present invention.
Figure 3:
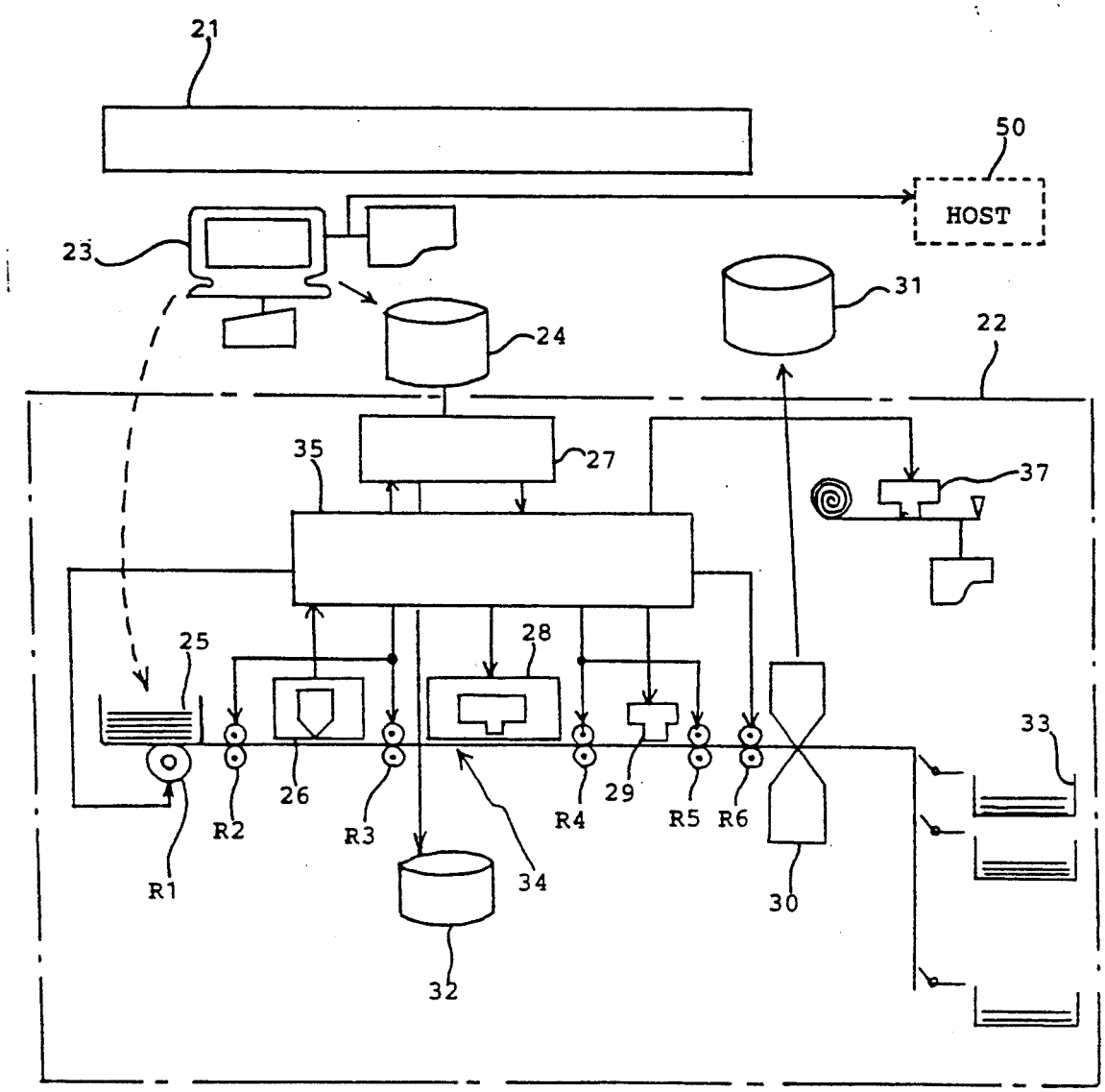
FIG. 3(a) is a diagram indicating a structure of a banking terminal apparatus for processing bills and checks of the present invention.
FIG. 3(b) is a schematic diagram of a format of data to be stored in the tentative paying file in FIG. 3(a)
Figure 3:
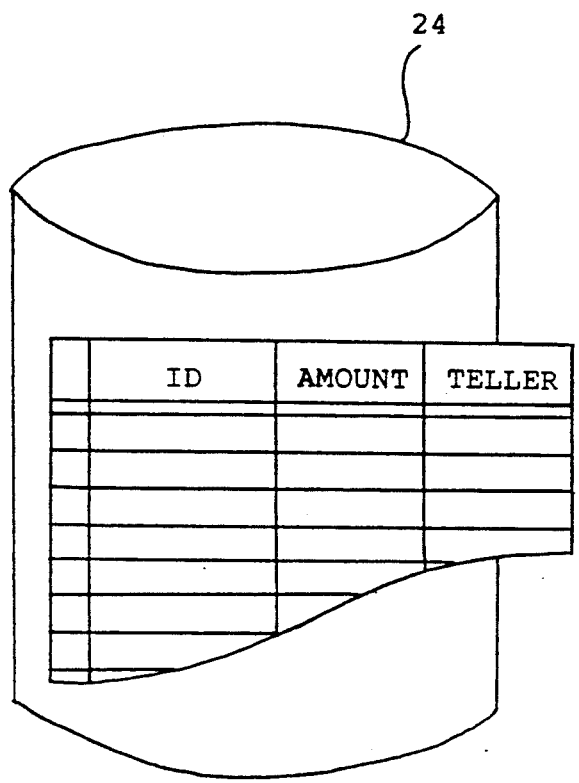

FIG. 2 is a block diagram for explaining the outline of a banking terminal apparatus for processing bills and checks. At the front counter 1, an input apparatus 3 from which a teller inputs the number of an account, clearinghouse and issue and an amount of a bill or check, and a tentative paying file 4 to store the number of account, clearinghouse and issue and amount input from the input apparatus, are provided. The bill or check itself is immediately transferred to the back office and is placed on a transferring apparatus 14 and is then sequentially sent to a magnetic ink character reader 6, an amount encoder 8, a lateral-line marking apparatus 9 and an imaging apparatus 10.

The number of the account described by the magnetic ink characters on the bill or check carried by the transferring apparatus 14 is read by the magnetic ink character reader 6 and the amount on the bill or check stored in the tentative paying file 4 is read by an amount reader 7 based on the number of account read by the magnetic ink character reader 6. The amount data is described or imprinted on the predetermined area of the bill or check by the amount encoder 8 with the magnetic ink. At this time, the amount data readout is subtracted from a preset total amount and the total amount is checked by the total amount checking apparatus 12. A lateral line is marked by the lateral-line marking apparatus 9 on the bill or check on which the amount is described by the amount encoder 8.

Next, the front and rear surfaces of the bill or check having completed such processing are imaged or photographed by the imaging apparatus 10. The image data for the photographs are stored in an image file 11.

FIG. 3(a) shows a structure of a bill or check processing apparatus according the present invention. As shown in FIG. 3(a), this apparatus includes a front counter 21 and a back office 22. At the front counter 21, the numeral 23 designates an input apparatus which is placed on the front counter to input the number of an account and the amount of a bill or check presented by a customer and tentatively makes an entry to the account or bank book of the customer. The numeral 50 designates a host computer which is located at a center to simultaneously input and store the data input to the input apparatus. The numeral 24 designates a tentative paying file for storing the number of the account and the amount input to the input apparatus 23. An example of the format of data to be stored in the tentative paying file 24 is shown in FIG. 3(b). In a bill or check identifying column ID, is a number, which identifies a bill or check and corresponds to the amount on a one to one basis, such as a bill or check number, bank exchange number or number of the account.

In the back office 22, the numeral 25 designates a hopper to which the bills or checks having completed processing at the front counter 21 are carried in; 26, a magnetic ink character reader (MICR) for reading the number of account described by the magnetic ink in the predetermined region of a bill or check; 27, an amount reader for reading the amount of a bill or check from the tentative paying file 24 depending on the number of the account read by the magnetic ink character reader 26; 28, an amount encoder for printing the amount read by the amount reader with the magnetic ink to the predetermined region of a bill or check; 29, a lateral-line marking apparatus for marking lateral lines on a bill or check; 30, an imaging apparatus comprising a couple of image sensors for taking pictures of both surfaces of a bill or check; 31, an image file for storing image data of pictures taken by the image sensors; 32, a total amount checking apparatus for subtracting the amount read by the amount reader 27 from the total amount input previously from the tentative paying file 24 and checks finally that the amount becomes zero; and 33 is a sorter for sorting bills or checks which have completed all processing.

The numeral 34 designates a transferring apparatus for automatically transferring, sheet by sheet, the bills or checks previously placed in the hopper 25 to the magnetic ink character reader (MICR) 26, the amount encoder 28, the lateral-line marking apparatus 29, and the imaging apparatus (image sensors) 30. R1, R2, R3, R4, R5 and R6 designate feed rollers. The numeral 35 designates a control apparatus (CPU) for controlling all apparatuses including the feed rollers R1, R2, R3, R4, R5 and R6. The numeral 37 designates a tag editing apparatus for editing a processing result to print the result on the tag.

Figure 4:
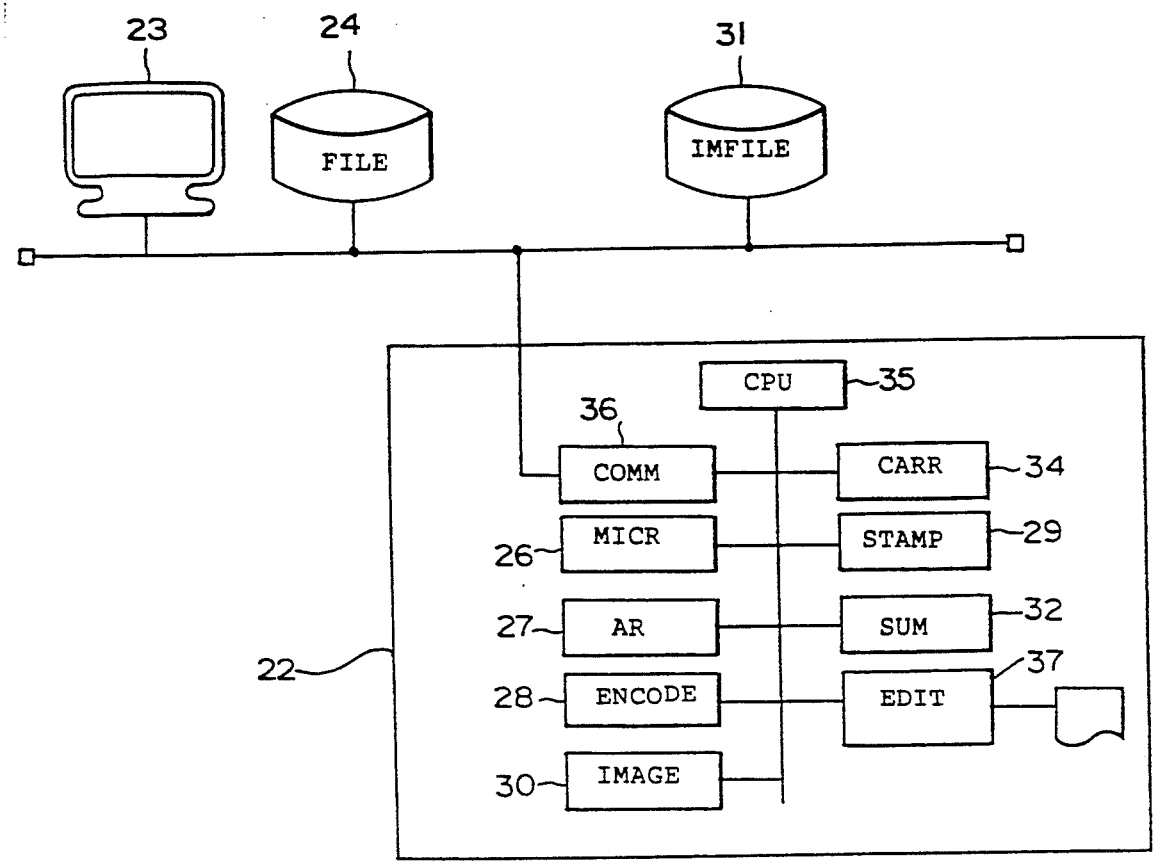
FIG. 4 is a block diagram indicating the control system of a banking terminal apparatus for processing bills and checks of the present invention.

These apparatuses are controlled by a control system shown in the block diagram of FIG. 4. As shown in FIG. 4, the MICR 26, amount reader 27, amount encoder 28, lateral-line marking apparatus 29, image sensors 30, total amount checking apparatus 32 and transfer apparatus 34 installed in the back office 22 are controlled through connection to the control apparatus (CPU) 35. Moreover, a communication terminal 36 is provided for communication between the tentative paying file 24, image file 31 and the back office 22. In FIG. 4, furthermore, the back office is provided with the tag editing apparatus 37 for editing the tag to indicate the processing result.

Figure 5:
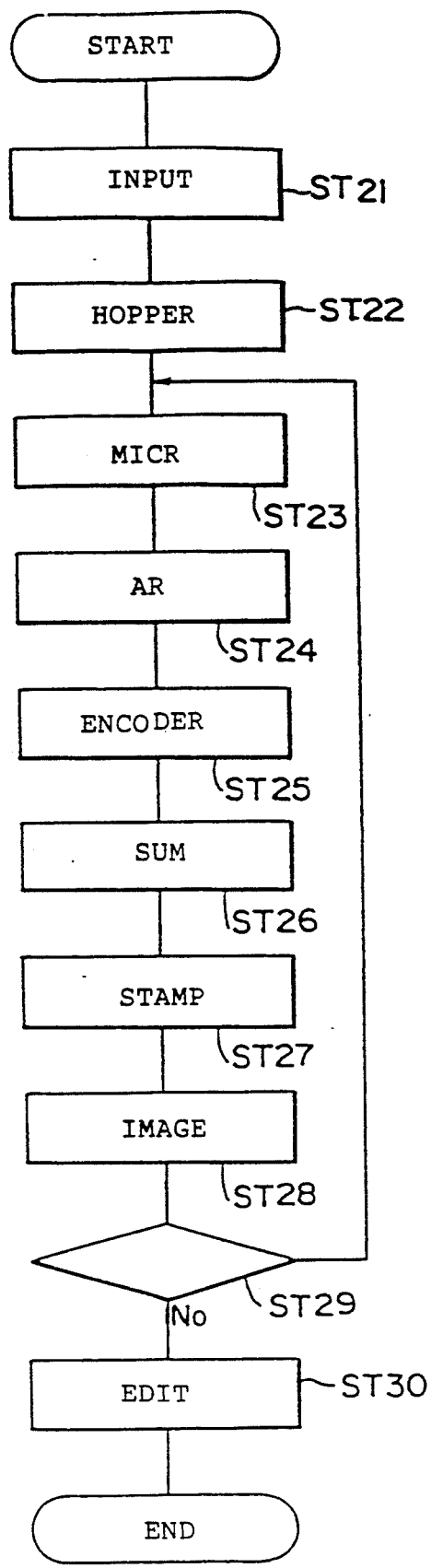
FIG. 5 is flowchart indicating the processing flow of a banking terminal apparatus for processing bills and checks of the present invention.

FIG. 5 is a flowchart indicating the flow of processing in the banking terminal apparatus for processing bills and checks, the apparatus having the structure shown in FIG. 3(a). Next, operations of the banking terminal apparatus for processing bills and checks of the present invention will be explained using the steps labelled from ST21 to ST30 of this flowchart.

ST21:

When a bill or check is carried to the front counter 21, a teller inputs the number of the account and the amount described on the bill or check to the input apparatus 23 from the keyboard. A bank book tentatively entering the data is returned to a customer as a receipt indicating tentative paying. The number of the account, the amount and the total amount which is input to the input apparatus 23 are stored in the tentative paying file 24.

ST22:

The bills and checks which have completed processing at the front counter 21 are placed in the hopper 25 in the back office.

ST23:

The first sheet, each sheet being a bill or check, is extracted from the hopper 25 by the roller R1 of the transfer apparatus 34 in response to the control apparatus 35, and is then carried to the magnetic ink character reader 26 by the roller R2. The magnetic ink character reader 26 reads the magnetic ink characters described in the predetermined region of the lower end part of this first sheet and outputs the number of the account.

ST24:

Upon receiving the number of the account output from the character reader 26, the amount reader 27 determines the amount of the first sheet of bill or check from the tentative paying file 24. During this period, the first sheet stays in the magnetic ink character reader 26.

ST25:

The first bill or check whose amount is read is transferred to the amount encoder 28 by the roller R3 of the transfer apparatus 34. Meanwhile, the second sheet, which is a bill or check, is extracted simultaneously from the hopper 25 by the roller R1 and is carried to the magnetic ink character reader 26 by the roller R2. The amount encoder 28 encodes the amount read by the amount reader 27 in a predetermined type of character using magnetic ink in a predetermined region of the first sheet.

ST26:

On the other hand, the amount checking apparatus 32 subtracts the amount associated with the first sheet from the total amount.

ST27:

The total amount checking apparatus 32 subtracts the amount of all bills or checks, and checks that the remainder finally becomes zero. If it does not become zero, it is displayed.

The second sheet of bill or check is sent to the magnetic ink character apparatus 26 like the first sheet of bill or check to read the number of the account. When the amount reader 27 reads the amount of the second sheet, the second sheet is then transferred to the amount encoder 28 by the roller R3.

Upon completion of encoding of the amount, the first sheet is transferred, by the roller R4 of the transfer apparatus 34, to the lateral-line marking apparatus 29 for marking of the lateral lines, in a timed relation such that the third sheet, which is a third bill or check, is transferred to the magnetic ink character reader 26.

ST28:

In timing with transfer of a fourth sheet of bill or check to the magnetic ink character reader 26, the first sheet of bill or check, on which the lateral lines has been marked, is extracted by the roller R5 from the lateral-line marking apparatus 29 and is then transferred to the image sensors 30 by the roller R6 of the transfer apparatus 34. Both surfaces of the first sheet of bill or check are photographed and the image data of pictures are then stored in the image file 31.

ST29:

Thereafter, the first sheet of bill or check is supplied to the sorter 33 by the transfer apparatus 34. These steps are carried out for all bills or checks accommodated in the hopper.

ST30:

Upon completion of the foregoing series of operations, the tag editing apparatus 37 edits, as a result of processing, the name of the bank and branch, operator name, date, total amount, and the number of bills or checks, and prints these data on the tag and discharges the tag.

Therefore, according to the present invention, the steps described above are carried out automatically after a teller once inputs the number of the account and the amount of a bill or check at the front counter, and generation of input error may thereby be reduced. Moreover, labor savings can also be attained because all processing in the back office, checking of the amount, and photographing of both surfaces, are carried out automatically. In addition, successive checking of bills or checks can be made easily by retrieving them from the image file based on the number of the accounts of such bills or checks.

What is claimed is:

1. A banking terminal apparatus for processing a plurality of items such as bills and checks having data associated therewith, said apparatus comprising:
reception apparatus provided at a front counter, said reception apparatus receiving the items brought by customers; and
processing apparatus, provided at a different place from said front counter, for conducting processing for transferring the items to a clearing house;
said reception apparatus further comprising:
an input means for successively inputting the data associated with each of said plurality of items to a storage means manually at the front counter, said data including the numbers of account, issue and clearinghouse, being written with magnetic ink as a preprint data, and the amount information; and a storage means for storing said preprint data and said amount, said storage means comprising a tentative paying file;

said processing apparatus further comprising:

a magnetic ink character reader for successively reading said preprint data on each of said plurality of items to output to said storage means said numbers of account, issue, and clearinghouse indicated by magnetic ink characters on each of said plurality of items;

an amount reader for reading said amount information stored in said tentative paying file corresponding to said preprint data for each of said plurality of items; and an amount encoder responsive to said amount information read by said amount reader for successively writing said amount information read by said amount reader, corresponding to said preprint data with magnetic ink, to a predetermined region of the respective one of said plurality of items.

2. A banking terminal apparatus for processing bills and checks according to claim 1, further comprising:

preset amount means for providing a preset total amount corresponding to a total of said item amount information for said plurality of items;

a total amount checking means for checking a total amount read by said amount reader for said plurality of items against said preset total amount;

a lateral-line marking means for marking lateral lines on each of said plurality of items;

an imaging means for forming an image of the front and rear surfaces of each of said plurality of items which has been processed;

an image file for storing image data of each said image formed by said imaging means; and a transfer means for successively transferring each of said plurality of items to said magnetic ink character reader, said amount encoder, said lateral-line marking means and said imaging means.

3. A banking terminal apparatus for processing bills and checks according to claim 2, further comprising:

a communication terminal for communicating with said tentative paying file and said image file;

a tag editing means for producing a processing result and printing said processing result on a tag; and a central control means for controlling said magnetic ink character reader, said amount reader, said amount encoder, said lateral-line marking means, said imaging means, said total amount checking means, said transfer means, said communication terminal and said tag editing means.

* * * * *